(12) United States Patent
Maxis

(10) Patent No.: US 11,971,061 B2
(45) Date of Patent: Apr. 30, 2024

(54) DEVICE FOR ATTACHMENT OF AN ACCESSORY TO A WALL BY SNAP-FIT

(71) Applicant: MXS GROUP, Buc (FR)

(72) Inventor: Guy Maxis, Buc (FR)

(73) Assignee: MXS GROUP, Buc (FR)

( * ) Notice: Subject to any disclaimer, the term of this patent is extended or adjusted under 35 U.S.C. 154(b) by 1220 days.

(21) Appl. No.: 16/476,589

(22) PCT Filed: Jan. 8, 2018

(86) PCT No.: PCT/FR2018/050032
§ 371 (c)(1),
(2) Date: Jul. 9, 2019

(87) PCT Pub. No.: WO2018/127673
PCT Pub. Date: Jul. 12, 2018

(65) Prior Publication Data
US 2019/0368520 A1 Dec. 5, 2019

(30) Foreign Application Priority Data
Jan. 9, 2017 (FR) ...................................... 17 50189

(51) Int. Cl.
*F16B 2/22* (2006.01)
*F16B 1/00* (2006.01)
(Continued)

(52) U.S. Cl.
CPC ............... *F16B 2/22* (2013.01); *F21V 21/02* (2013.01); *F21V 21/088* (2013.01); *F16B 1/00* (2013.01); *F16B 2200/93* (2023.08)

(58) Field of Classification Search
CPC ..... Y10T 403/32631; Y10T 403/32737; F16B 5/0664; F16B 5/126; F16B 21/06;
(Continued)

(56) References Cited

U.S. PATENT DOCUMENTS 769,780 A * 9/1904 Strickler ................ F16B 21/07
24/688
3,916,756 A * 11/1975 Yoda ..................... F16B 21/075
24/683
(Continued)

FOREIGN PATENT DOCUMENTS

AU 697754 B2 10/1998
DE 1935283 A1 * 1/1971
(Continued)

*Primary Examiner* — Jonathan P Masinick
(74) *Attorney, Agent, or Firm* — Faegre Drinker Biddle & Reath LLP

(57) ABSTRACT

The present disclosure relates to a device for attachment of an accessory, in particular a domestic accessory, on a wall, comprising a relief for snap-fit and a profile forming a base, where the base has first and second opposite flat surfaces, where the first surface of the base is intended to be attached flat on the wall and the snap-fit relief projects from the second surface of the base. The disclosure also relates to an accessory, and assembly of an attachment device and an accessory, a method for mounting an attachment device of an accessory and a method for attachment of an accessory onto an attachment device.

14 Claims, 10 Drawing Sheets

(51) Int. Cl.
*F21V 21/02* (2006.01)
*F21V 21/088* (2006.01)

(58) Field of Classification Search
CPC ...... F16B 21/065; F16B 21/07; F16B 21/071; F16B 21/073; F16B 21/078; F16B 12/26; F16B 12/38
See application file for complete search history.

(56) References Cited

U.S. PATENT DOCUMENTS

| | | | | |
|---|---|---|---|---|
| 4,067,532 A | | 1/1978 | Viteretto | |
| 4,408,372 A | * | 10/1983 | Kimura | F16B 21/073 411/61 |
| 5,143,469 A | * | 9/1992 | Cadeddu | B60T 13/52 403/135 |
| 5,443,323 A | * | 8/1995 | Prelat | B60Q 1/0683 403/135 |
| 5,467,571 A | * | 11/1995 | Khatibi | E04F 19/0463 403/388 |
| 6,857,809 B2 | * | 2/2005 | Granata | F16B 5/126 296/214 |
| 7,396,183 B2 | * | 7/2008 | Dona Contero | G05G 1/46 403/329 |
| 8,585,340 B2 | * | 11/2013 | Schmitz | F16B 5/065 411/301 |
| 9,216,702 B1 | * | 12/2015 | Mannor | B60N 2/6027 |
| 9,416,518 B2 | * | 8/2016 | Ditzler | F16C 11/069 |
| 9,836,080 B2 | * | 12/2017 | Park | F16M 11/041 |
| 11,352,793 B2 | * | 6/2022 | Haddock | E04D 13/00 |
| 2004/0151539 A1 | * | 8/2004 | Sikora | F16B 21/088 403/329 |
| 2011/0174939 A1 | | 7/2011 | Taylor | |
| 2015/0109769 A1 | * | 4/2015 | Chang | F21V 21/145 362/191 |
| 2015/0259068 A1 | | 9/2015 | Sanders | |
| 2018/0045336 A1 | * | 2/2018 | Vaccaro | F16L 3/221 |

FOREIGN PATENT DOCUMENTS

| | | | | |
|---|---|---|---|---|
| DE | 297 03 647 U1 | | 8/1997 | |
| DE | 202010015520 U1 | * | 3/2011 | ............ F16B 5/0628 |
| DE | 102013007677 A1 | * | 11/2014 | ............ H02K 41/02 |
| DE | 102013105335 A1 | * | 11/2014 | ......... B60R 13/0838 |
| DE | 102013020501 A1 | * | 6/2015 | ............ B01D 27/08 |
| DE | 102016220483 A1 | * | 4/2018 | |
| EP | 0 283 016 A1 | | 9/1988 | |
| FR | 1192068 A | * | 10/1959 | |
| GB | 2241277 A | * | 8/1991 | ............... B62B 9/00 |
| JP | S61 268215 A | | 11/1986 | |
| KR | 20090022504 A | * | 3/2009 | |
| WO | 90/09135 A1 | | 8/1990 | |

* cited by examiner

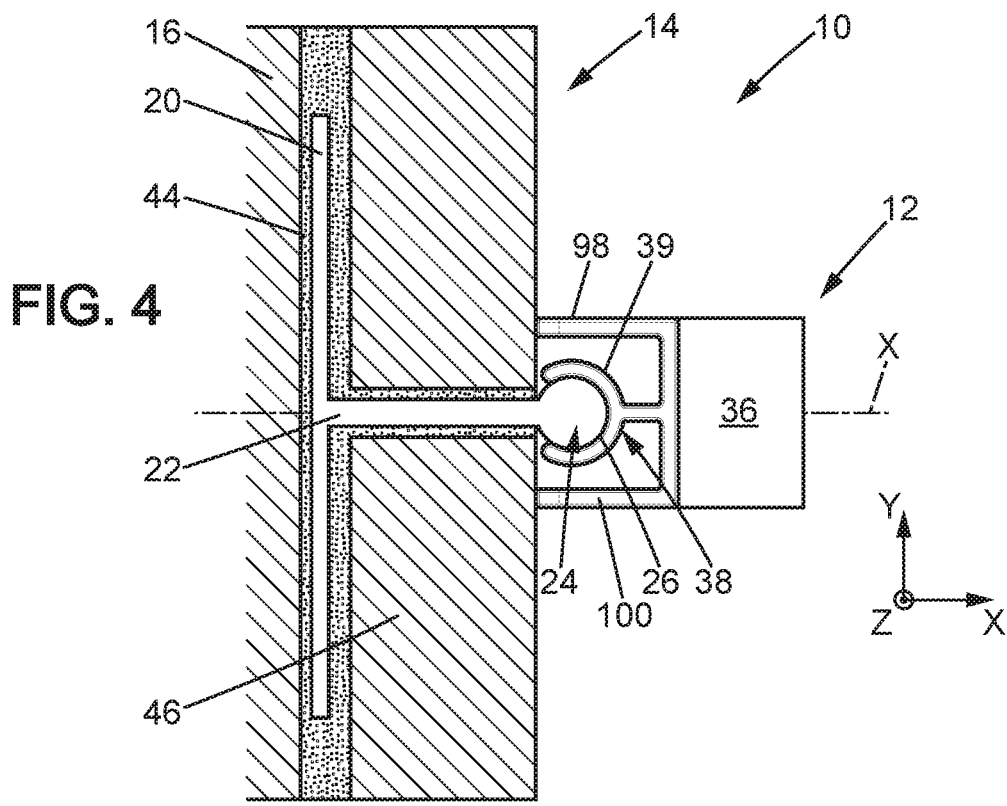
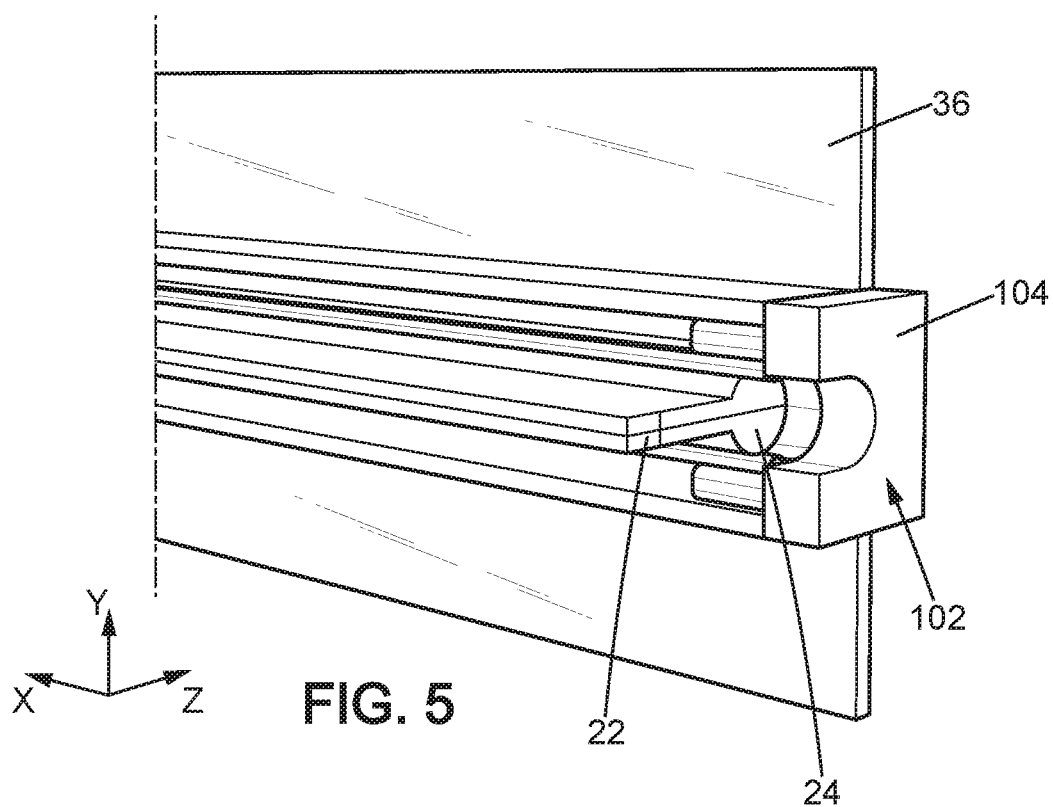

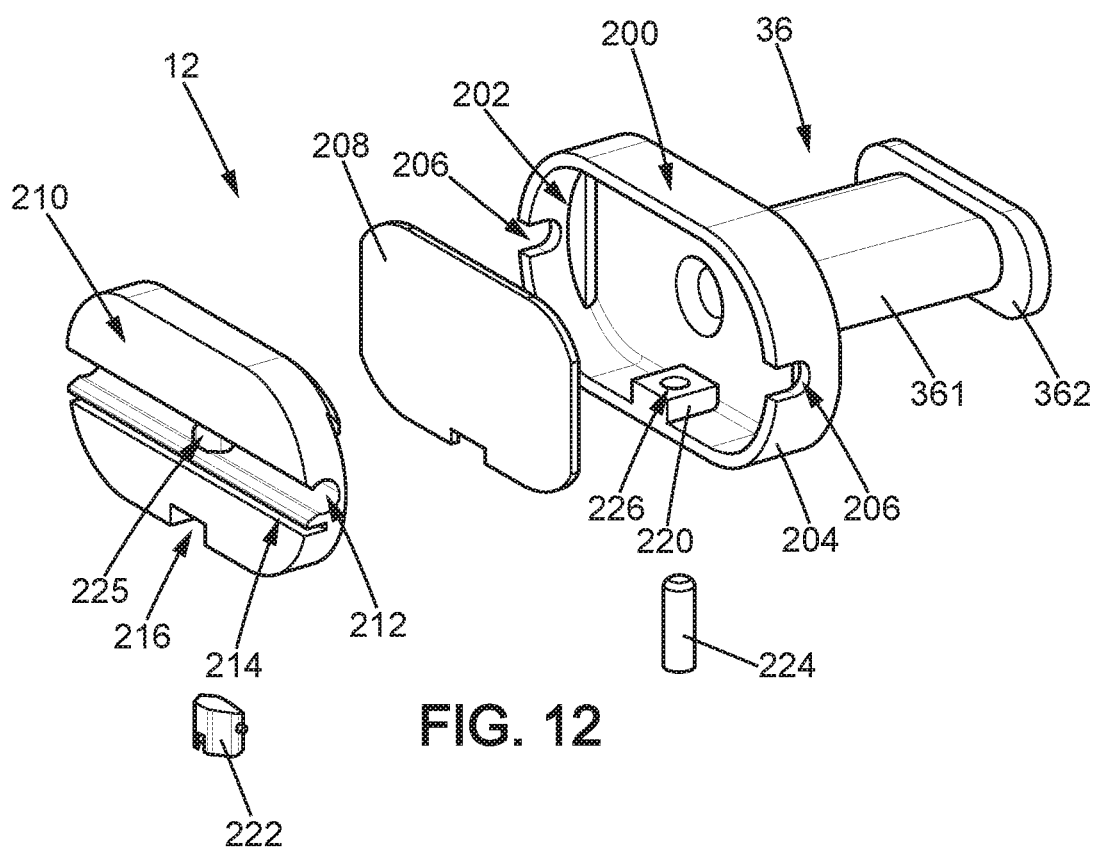
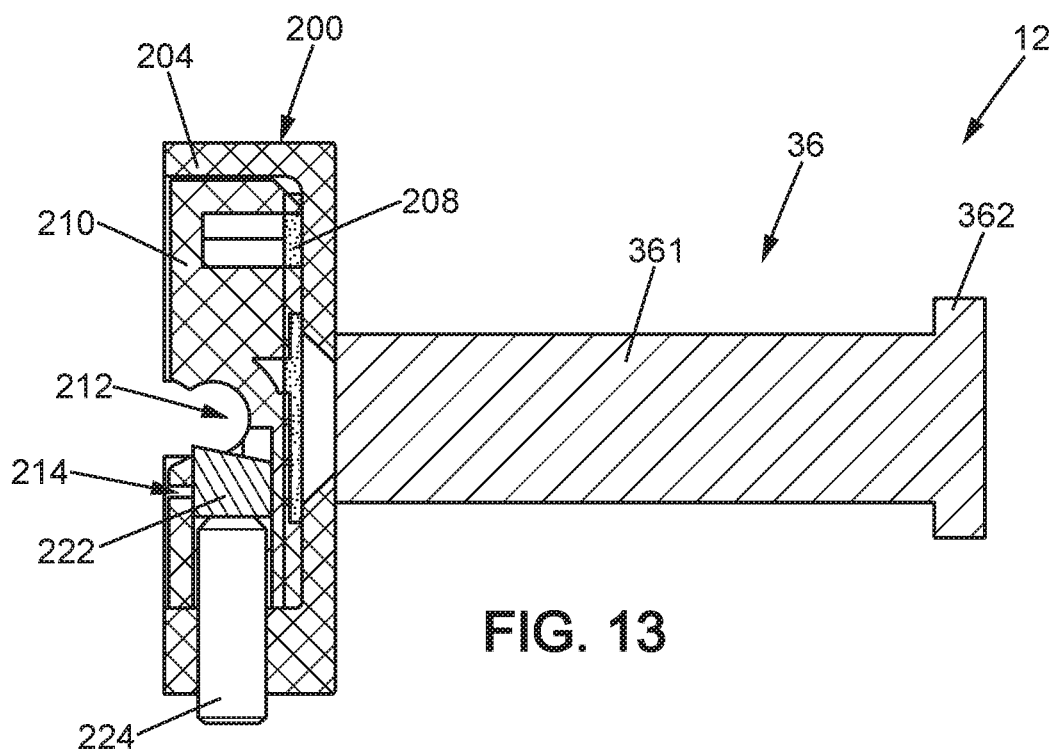

DEVICE FOR ATTACHMENT OF AN ACCESSORY TO A WALL BY SNAP-FIT

CROSS-REFERENCE TO RELATED APPLICATIONS

This application is the U.S. national phase of the International Patent Application No. PCT/FR2018/050032 filed Jan. 8, 2018, which claims the benefit of French Application No. 17 50189 filed Jan. 9, 2017, the entire content of which is incorporated herein by reference.

FIELD

The present disclosure relates to a device for attaching an accessory to the wall, an accessory able to be attached on this attachment device and an assembly comprising the device for attachment to the wall and the accessory. The present disclosure also targets a method for mounting an attachment device on a wall and a method for attachment of an accessory to a wall by implementing this mounting method.

BACKGROUND

There are many solutions with which to attach an accessory, in particular a domestic accessory, onto a wall. For example, a hook can be fixed in a hole previously drilled in the wall for taking the accessory thereon, for example a towel holder. However, these hooks are not very aesthetic. Further, drilling into a wall can be a risky operation, especially when the wall is covered with tiles, marble or other stiff and/or fragile flat materials.

Kessebömer sells an aluminum rail to be attached to the wall, for example in a kitchen, under the tradename LIN-ERO MosaiQ. The rail forms a housing with a rim. L-shaped shelves, having a turned-down edge at the upper end thereof, could thus be attached to the wall with the turned-down edge coming to rest on the rim of the housing formed by the rail. The shelves are also resting against the wall.

The aluminum rail is however not aesthetic. It is also prominent and easily collects dust. In particular, the mounting of the accessory on the rail is impractical and unreliable.

The object of the present disclosure is to propose a device and a method for attachment of accessories, in particular domestic accessories, to walls, for example of a kitchen or bathroom, without the aforementioned disadvantages. In particular, the disclosure aims to propose a device that is easy to use, preferably aesthetic and low maintenance.

This goal of the disclosure is achieved by means of a device for attachment of an accessory, in particular a domestic accessory, on a wall, comprising a relief for snap-fit and a profile forming a base, where the base preferably is intended to be covered by a wallcovering, where the base has first and second opposite flat surfaces, where the first surface of the base is intended to be attached flat on the wall and the snap-fit relief projects from the second surface of the base.

Thus, advantageously, once the attachment device is attached on the wall, an accessory, in particular a domestic accessory, can be easily attached to it by snap-fit.

SUMMARY

According to various embodiments, the device according to the disclosure has one or more of the following characteristics, taken alone or in combination:

The profile forms a housing for receiving a part, preferably two parts, also preferably two parts symmetric about a median plane of the snap-fit relief, where the one or more parts form the snap-fit relief and the snap-fit relief is preferably a female relief;

The profile forms the snap-fit relief, where the snap-fit relief is preferably a male relief;

The snap-fit relief is connected to the second surface of the base by a blade, where preferably a tab extends from a side of the blade, preferably from each side of the blade, parallel to the second surface of the base;

The blade has a height, measured along the direction normal to the second surface of the base, greater than 2 mm, preferably 4 mm, again preferably over 5 mm and/or less than 15 mm, preferably 14 mm and/or the height of the blade is preferably equal to 8, 9, 10, 11, 12.5 or 13.5 mm;

The blade has a width, measured parallel to the second surface of the base, in a transverse plane of the profile, over 0.5 mm, preferably over 1 mm and/or less than 3 mm, preferably less than 2 mm;

The snap-fit relief comprises, in transverse section, a substantially round shape, in particular over an angular sector extending over at least 180°, preferably over at least 270°, where the angular sector is preferably symmetric about a median axis of the snap-fit relief and/or of the blade, as applicable;

The snap-fit relief comprises, in transverse section, at one end of said angular sector and/or at each end of said angular sector, one among a radial projection and an indentation;

The snap-fit relief comprises at least one, preferably exactly two, longitudinal walls extending from the second surface of the base along a direction normal to the second surface;

The profile, in particular the snap-fit relief, is provided with electrical conductors and/or light sources, in particular LEDs;

The device comprises at least one electrical conductor, preferably at least two electrical conductors, where the one or more electrical conductors follow preferably the surface of the snap-fit relief, in particular the angular sector, if applicable, or the base, where the one or more electrical conductors are for example received in the grooves made in the surface of the snap-fit relief, in particular the angular sector if applicable, which extends parallel to the longitudinal direction of the profile;

The base extends, in transverse section, from only one side of the snap-fit relief or, preferably, from both sides of the snap-fit relief; and The profile is made of one among aluminum, in particular extruded and/or anodized aluminum, stainless steel, in particular, natural, brushed and/or keyed, and plastic.

The disclosure also relates to an accessory, in particular a domestic accessory, provided with a snap-fit relief intended to engage with the snap-fit relief of a device for attachment of an accessory such as described above in all combinations thereof.

Preferably the accessory is chosen among: a coat hook, a towel rod, a roll dispenser, sideboard, glass holder, soap tray, key rack, mobile phone or tablet support, a brush, a mirror, a shelf, a tool rack, in particular a rack for kitchen utensils, a spice rack, a coffee-pod rack, a basket, a knife holder, in particular a magnetic knife holder, aluminum foil or paper towel dispenser, pots, a spotlight, in particular an LED spotlight, an LED task light, an LED ribbon, an LED profile, an LED bulb, an LED projector, a light decoration, a laundry basket, a magnifying mirror for cosmetics, a tray, a towel rod rack, a splashback, a knife holder, a bottle holder, a cotton-tip dispenser, a cotton ball dispenser, a broom rack, a magazine rack, a trash can, a shower caddy, a tissue box, a laundry line, a shower basket, a hook, a coat hook, a dish rack, a cutting board, a liquid-soap dispenser, a cup, a glass and a glass holder, a toothbrush holder, a wall basket, a cup, a vase, a photo frame, a handrail, a clock, a television, an LCD or LED or OLED screen, an electric switch, a USB plug, an HDMI plug, an acoustic enclosure, a camera, a fan, a hanging rod, a curtain, a curtain rod, a presence detector, a smoke detector, a carbon monoxide detector, a pollution detector, an ionizer, an air filter, and a picture rail.

Also preferably, since the accessory comprises a housing complementary to the snap-fit relief of the device for attachment of an accessory, a flexible or deformable sheet is inserted in the complementary housing, where the sheet preferably extends at least in part along one wall of the complementary housing, where the complementary housing is able to receive the snap-fit relief of the device for attachment of an accessory, by snap-fit, such that the sheet is at least in part interposed between the snap-fit relief of the device for attachment of an accessory and said one wall of the complementary housing, where the accessory comprises, again preferably, a means for immobilizing the snap-fit relief of the device for attachment of an accessory in said complementary housing.

The accessory may comprise a housing complementary to the snap-fit relief of the device for attachment of an accessory, in which a flexible or deformable sheet is inserted in the complementary housing, where the sheet preferably extends at least in part along one wall of the complementary housing, where the complementary housing is able to receive the snap-fit relief of the device for attachment of an accessory, by snap-fit, such that the sheet is at least in part interposed between the snap-fit relief of the device for attachment of an accessory and said one wall of the complementary housing, where the accessory comprises, again preferably, a means for immobilizing the snap-fit relief of the device for attachment of an accessory in said complementary housing.

The disclosure also relates to an assembly with an accessory, in particular a domestic accessory, as described above, in all combinations thereof, and a device for attachment of an accessory as described above, in all combinations thereof.

According to another aspect, the disclosure also relates to a method for mounting an attachment device for an accessory as described above in all combinations thereof, on the wall, comprising the steps of:
a) Attachment of the device on the wall, in particular using adhesive and/or screws;
b) Application of a finishing layer covering the wall and the base of the device, such that the snap-fit relief is accessible, in particular where the snap-fit relief projects from the finishing layer, where a jig is preferably snap-fitted in the snap-fit relief to assure that said snap-fit relief projects from said finishing layer once the finishing layer is applied to the wall.

Preferably, the finishing layer comprises, preferably consists, of a flat or relief material attached to the wall, where the flat or relief material preferably comprises squares, strips and/or plates of at least one among:
Tiles, in particular stoneware tile, cement or earthenware tiles;
Metal, in particular stainless steel or aluminum, in particular brushed aluminum;
Glass;
Wood;
Stone, in particular granite or marble; and
Plaster.

According to another aspect, the disclosure relates to a method for attachment onto a wall of an accessory, in particular a domestic accessory, such as described above in all combinations thereof, consisting of using a mounting method such as described above, in all combinations thereof, for attaching an attachment device such as described above, in all combinations thereof, onto a wall, and attaching the accessory onto the attachment device, by snap-fit of the respective snap-fit reliefs thereof.

According to another aspect, the disclosure relates to a jig intended to be fixed by snap-fit onto an attachment device such as described above in all combinations thereof, in particular during a method for attachment onto a wall of the attachment device, in order to assure that the snap-fit relief of the attachment device is accessible after application to the wall of a finishing layer, where the jig has a relief complementary to the snap-fit relief of the attachment device, and where the complementary relief is intended to receive by snap-fit the snap-fit relief of the attachment device.

The jig may comprise, on either side of the complementary relief, two flat surfaces intended to be flush against the finishing layer.

The jig may further comprise two walls extending from either side of the complementary relief intended to be inserted between the finishing layer on one side and the blade of the attachment device on the other, in particular between the finishing layer and the one or more tabs extending from the blade, as applicable.

BRIEF DESCRIPTION OF THE DRAWINGS

Other aspects, goals and advantages of the disclosure will appear upon reading the following description which refers to the attached drawings among which:

FIG. 4 schematically illustrates in section a second example of assembly of an accessory and a device for attachment of the accessory onto a wall;

FIGS. 5 and 6 show a variant of the example from FIG. 4, respectively, in perspective and in section;

FIG. 12 represents schematically, in exploded view, an accessory which can be attached onto a wall by means of an attachment device according to one of FIGS. 1 to 9 and 11;

FIG. 13 is a longitudinal section view of the accessory from FIG. 12; and

DETAILED DESCRIPTION

In the remainder of the description, identical elements or elements with identical function have the same reference sign. For the purpose of conciseness of the present application, these elements are not described in connection with each example, only the differences between the embodiments are discussed in detail.

Figure 1:
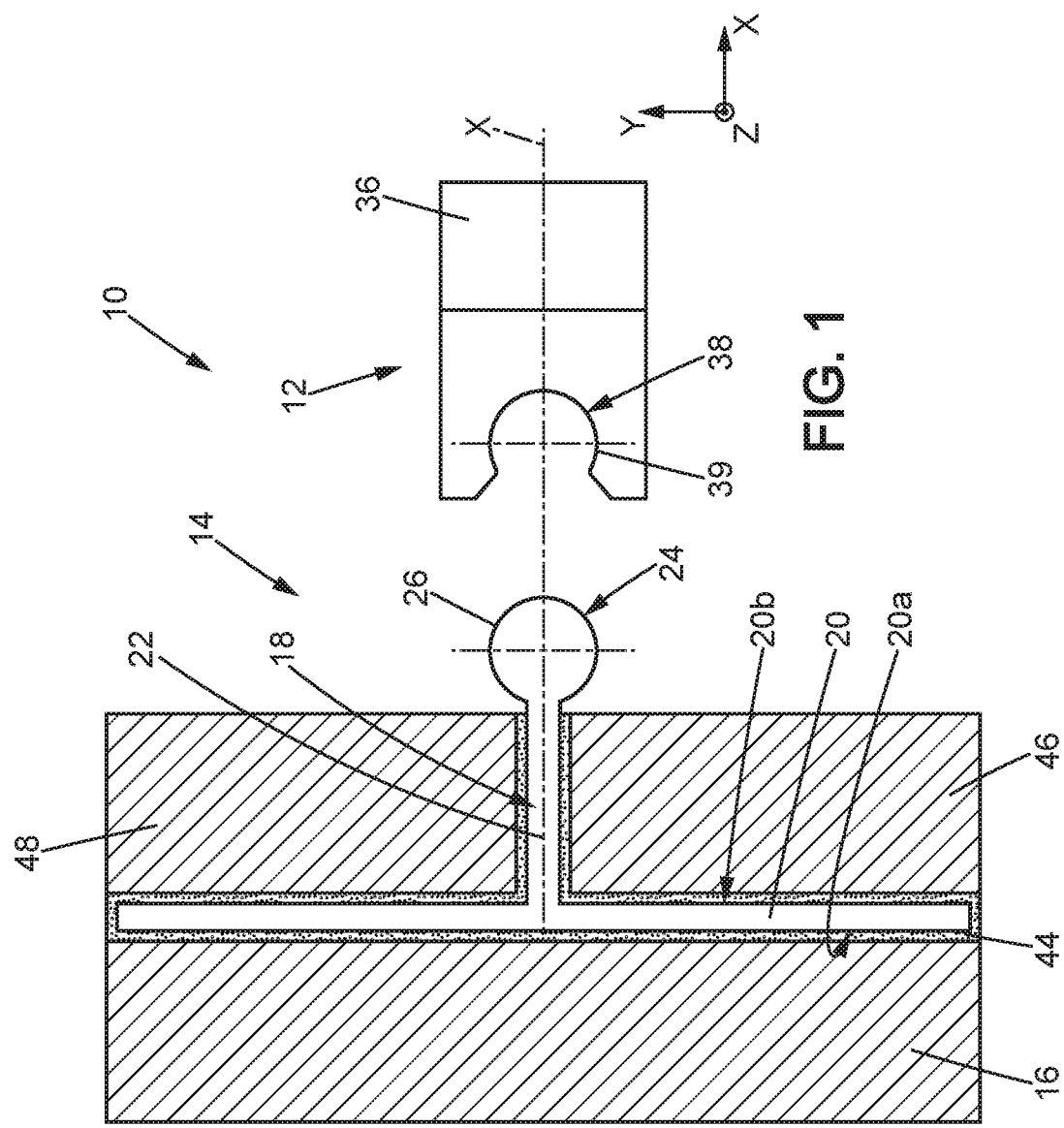
FIG. 1 schematically shows a transverse section view of a first example assembly of an accessory in a device for attachment of the accessory onto the wall.

FIG. 1 illustrates a first example of an assembly 10 of an accessory 12, in particular a domestic accessory, and a device 14 for attachment of the accessory 12 onto the wall 16.

Here the attachment device 10 is made in the form of a profile 18 extending along the longitudinal direction Z.

The profile 18 is for example made of one from aluminum, in particular extruded and/or anodized aluminum, offering durability and easy maintenance, and stainless steel, in particular brushed, keyed or black matte. As a variant, the profile is plastic.

The transverse section of the profile 18, as shown in FIG. 1, first comprises a base 20, meaning a flat plate that is preferably predrilled where one first flat surface 20a is attached flat onto the wall 16. The width of the base 20 measured along the Y direction included in the surface 20a and perpendicular to the longitudinal direction Z of the profile 18 is for example included between 10 mm and 150 mm Here, the width of the base is for example 40 mm.

A blade 22 extends from the second flat surface 20b of the base 20, opposite from the first surface 20a, along the direction X normal to the first and second surfaces 20a, 20b. Like the profile 18, the blade 22 extends along the longitudinal direction Z. The blade 22 however has a height, measured in the X direction normal to the first and second surfaces 20a, 20b, over 4 mm, preferably over 5 mm and/or less than 30 mm, preferably less than 20 mm. Here, as an example, the blade 22 has a height of 10 mm. As a variant, the height can be equal to 8, 9, 10, 11, 12.5, 13.5, 15, 17.5 or 20 mm. The blade 22 also has a width, measured along the transverse direction Y, included between 1 mm and 5 mm, for example. Here, as an example, the width of the blade 22 is 1.5 mm. Such a width for the blade provides for the mechanical strength thereof.

At the free end of the blade 22, opposite the base 20, the profile forms a snap-fit relief 24. Here, the nesting relief 24 is a male relief. Seen in transverse section, the snap-fit relief 24 is symmetric about a median axis X, shared with the blade 22. The snap-fit relief 24 comprises a first constant-radius circular angular sector 26 at the end of the blade 22. Here, the first angular sector 26 has a radius of 2 mm.

The accessory 12, which can be attached onto the attachment device 14, for its part has a useful part 36, so that the accessory can fulfill a function, and a snap-fit relief 38, here a female relief, complementary to the male snap-fit relief 24 of the attachment device 14. More precisely, here, the snap-fit relief 38 of the accessory 12 is formed of a housing 39. Here the housing 39 corresponds to an angular sector with substantially the same radius as the first angular sector 26 of the snap-fit relief 24 of the attachment device 14. The angular sector corresponding to the housing 39 is preferably over 180°. It is therefore possible to snap-fit the snap-fit reliefs 24, 38 one on the other.

The attachment device 14 can be mounted on the wall 16, in particular on the wall 16 of a bathroom or kitchen, by making use of the following method. First, the attachment device 14 is attached to the wall 16. Screws can be used to do that, for example. Preferably, however, adhesive 44 is used to do that. Next, a finish coat 46 is applied to the wall 16 and covers the wall 16 such that the snap-fit relief 24 of the attachment device 14 is accessible. The finish coat 46 can in particular be a splashback. To do that, a jig, snap-fitted on the snap-fit relief 24 of the attachment device 14 can be used during the application of the finishing layer 46 in order to assure that said snap-fit relief 24 projects from said finishing layer 46 after this layer is applied to the wall 16.

In order to allow the male relief to project from the finishing layer 46, the height of the blade 22 can be chosen equal to or substantially larger than the thickness of the finishing layer 46.

The finish coat 46 can in particular comprise, preferably consist, of a flat or relief material attached to the wall 16. The flat or relief material preferably comprises a substantially flat surface intended to be oriented towards the wall, and a surface, opposite said surface oriented towards the wall, respectively substantially flat or, instead, forming reliefs. The flat or relief material preferably comprises squares, strips, a mosaic and/or plates in at least one from:

Tiles, in particular stoneware tiles, cement or earthenware tile;

Metal, in particular stainless steel or aluminum, in particular brushed and/or anodized aluminum;

Glass;

Wood;

Plaster, especially wallboard;

Stone, in particular granite or marble; and

Plastic, especially a composite material.

Here, as an example, the blade 22 of the attachment device 10 is sandwiched between two tiles for tiling 48, such that only the snap-fit relief 24 of the attachment device 10 projects from these tiles 48. The attachment device 10 is thus particularly discrete. Further, the simple and neat geometry of the snap-fit relief 24 limits the creation of clumps of dust, itself limiting the necessary maintenance.

The accessory 12 supplied with its snap-fit relief 38, can then easily be attached to the wall 16 by snap-fit of the snap-fit reliefs 24, 38, one on the other.

The accessory 12 is preferably a domestic accessory. In particular, the domestic accessory 12 can be chosen among: a coat hook, a towel rod, a roll dispenser, sideboard, glass holder, soap tray, key rack, mobile phone or tablet support, a brush, a mirror, a shelf, a tool rack, in particular a rack for kitchen utensils, a spice rack, a coffee-pod rack, a basket, a knife holder, in particular a magnetic knife holder, aluminum foil or paper towel dispenser, pots, a spotlight, in particular an LED spotlight, an LED task light, an LED ribbon, an LED profile, an LED bulb, an LED projector, a light decoration, a laundry basket, a magnifying mirror for cosmetics, a tray, a towel rod rack, a splashback, a knife holder, a bottle holder, a cotton-tip dispenser, a cotton ball dispenser, a broom rack, a magazine rack, a trash can, a shower caddy, a tissue box, a laundry line, a shower basket, a hook, a coat hook, a dish rack, a cutting board, a liquid-soap dispenser, a cup, a glass and a glass holder, a toothbrush holder, a wall basket, a cup, a vase, a photo frame, a handrail, a clock, a television, an LCD or LED or OLED screen, an electric switch, a USB plug, an HDMI plug, an acoustic enclosure, a camera, a fan, a hanging rod, a curtain, a curtain rod, a presence detector, a smoke detector, a carbon monoxide detector, a pollution detector, an ionizer, an air filter, and a picture rail. A picture rail or display rail is a molding, generally of wood, aluminum and/or steel, located close to the ceiling for attaching hooks for suspending pictures and/or frames.

Figure 2:
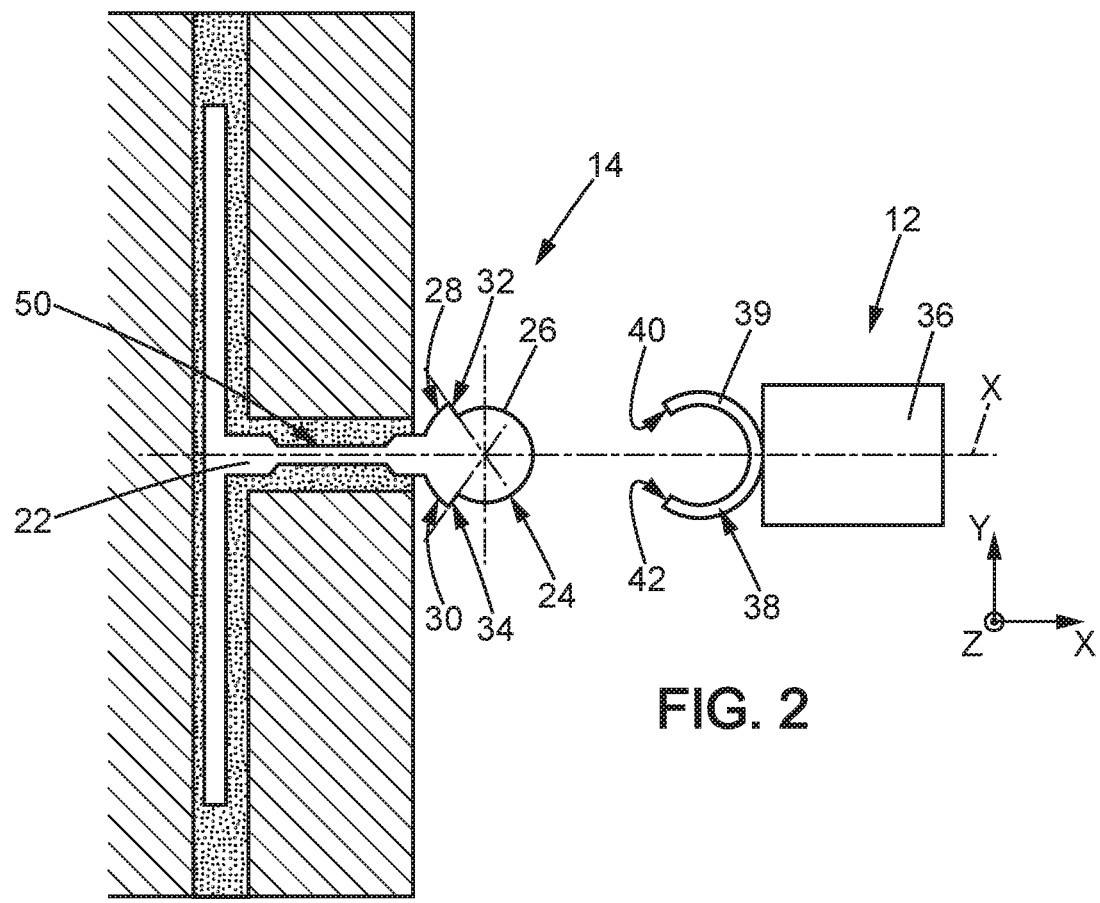
FIG. 2 is a schematic section of a variant of the assembly of an accessory and a device for attachment of the accessory onto a wall from FIG. 1.

FIG. 2 shows in transverse section view an assembly substantially identical to the assembly from FIG. 1. Here, however, the blade 22 is thinner 50 over a portion of the height thereof. Here, the thinner portion 50 corresponds to a thickness of about 0.5 mm, there where the blade 22 is about 1.5 mm thick outside of this thinner portion 50. This thinner portion 50 extends substantially along two thirds of the height of the blade 22. Because of this thinner portion, in the median area of the blade 22, an even more effective attachment of the attachment device 14 can be provided also using adhesive means implemented for attaching the finishing layer 46 to the wall 16.

Further, at the free end of the blade 22, opposite the base 20, the profile forms a male snap-fit relief 24. Seen in transverse section, the snap-fit relief 24 is symmetric about a median axis X, shared with the blade 22. The snap-fit relief 24 comprises a first constant-radius circular angular sector 26 connected to the stem by two symmetric constant-radius angular sectors 28, 30, with a radius greater than the radius of the first angular sector 26, thus forming two flat stop surfaces 32, 34, in the form of radial projections. More precisely, here, the first angular sector 26 has a radius of 2 mm over an angular sector extending through 250°, whereas the two symmetric angular sectors 28, 30 have a radius of 2.75 mm and extend from the stop surfaces 32, 34 to the blade 22.

The accessory 12, which can be attached onto the attachment device 14, for its part has a useful part 36, so that the accessory can fulfill a function, and a snap-fit relief 38, here a female relief, complementary to the snap-fit relief 24 of the attachment device 14. More precisely, here, the snap-fit relief 38 of the accessory 12 is formed of a housing defined by a cylindrical portion 39 of circular section. Here the cylindrical portion 39 corresponds to an angular sector with the same size as the first angular sector 26 of the snap-fit relief 24 of the attachment device 14. The inner radius of the cylindrical portion 39 is equal to the radius of the first angular sector 26 of the snap-fit relief 24 of the attachment device 10. In that way the snap-fit reliefs 24, 38 can be snap-fitted one on the other.

Further, here, the outer radius of the cylindrical portion 39 is equal to the radius of the symmetric angular sectors 28, 30 of the snap-fit relief 24 of the attachment device 14. Thus, when the snap-fit reliefs 24, 38 are snap-fitted one on the other, they form a very aesthetic regular cylinder. In particular, with this regular cylinder shape, clumps of dust can be avoided which appear in the case of less regular shapes and which consequently require maintenance.

Further, the ends 40, 42 of the cylindrical portion 39 seen in transverse section are suited for being stopped on the stop surfaces 32, 34 of the snap-fit relief 24 of the attachment device 14 when the snap-fit reliefs 24, 38 are snap-fitted one on the other.

The FIGS. 3A to 3I illustrate variants of the male 24 and female 38 snap-fit reliefs.

Figure 3A:
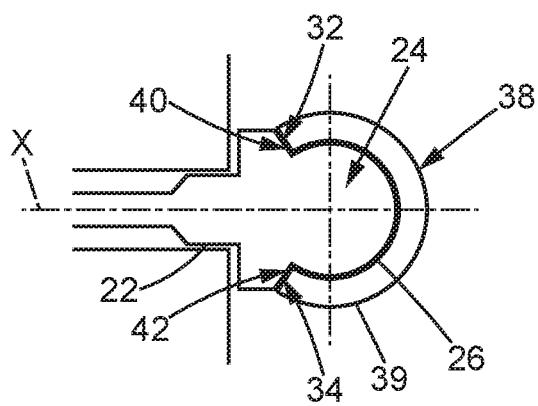
FIGS. 3A to 3H show schematically in section variants of the nesting relief that can be implemented in the assembly of an accessory and a device for attaching the accessory onto a wall from FIG. 1.

In FIG. 3A, the male relief 24 has two radial projections 32, 34 forming stop surface for the female relief 38. However, here, the male relief 24 extends from the summit of the radial projections 32, 34 substantially parallel to the median axis X, shared with the blade 22. Thus the dimensions of the hollow relief between the attached accessory 12 and the wall 16, where clumps of dust could form, are limited.

Figure 3B:
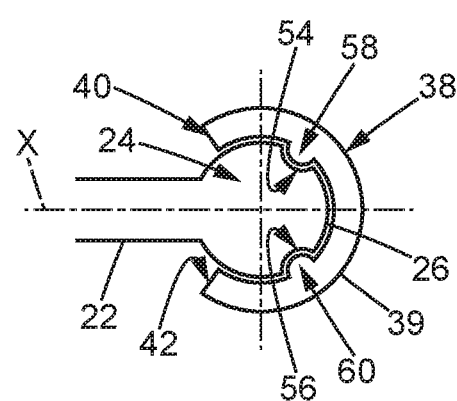

In FIG. 3B, the male relief 24 is substantially circular over all the contour thereof, except for two hollow reliefs 54, 56, symmetric about the median axis X of the male relief 24 and the blade 22, suited to receive two complementary reliefs 58, 60 from the female relief 38. The engagement of the hollow reliefs 54, 56 with the complementary reliefs 58, 60 serves to prevent a relative rotation of the female relief 38 relative to the male relief 24 once the accessory is attached onto the attachment device. Here, the hollow reliefs 54, 56 and the complementary reliefs 58, 60 have a rounded circular section, for reasons of ease of execution. Just the same, other shapes and/or positions for the hollow reliefs 54, 56 and the complementary reliefs 58, 60 can be considered.

Figure 3C:
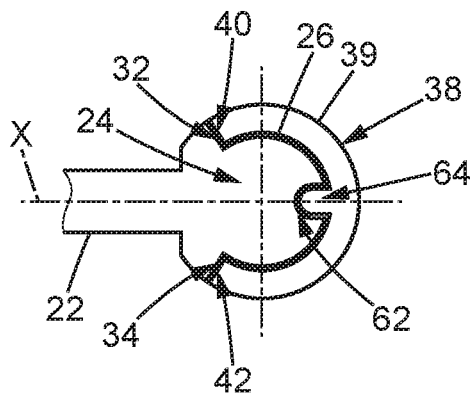

The male relief 24 from FIG. 3C is substantially identical to the male relief 24 from FIG. 2. It further has a housing 62 suited to receive an additional relief 64 from the female relief 38, substantially identical to the female relief from FIG. 2. The housing 62 is substantially symmetrical about the median axis X of the male relief 24 and the blade 22. This housing 62 and engagement thereof with the complementary relief 64 of the female relief 38 provides a more precise centering of the female relief 38 on the male relief 24.

Figure 3D:
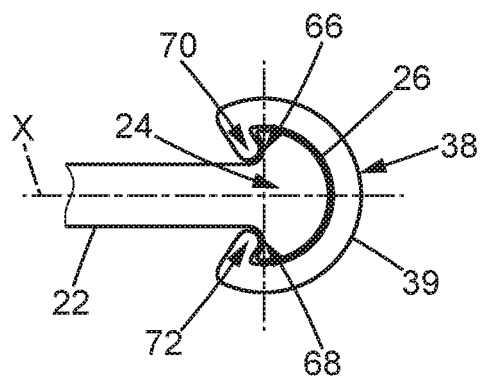

In FIG. 3D, the constant-radius angular sector 26 extends between two hollow housings 66, 68 made by indentations. The angular sector 26 has a smaller extent than in the example from FIG. 2. Here, for example, the angular sector 26 extends substantially 190°. The female relief 38 then comprises a cylindrical portion 39 over a constant-radius angular section for engaging with the angular sector 26 of the male relief 24, which ends at each end with an arm 70, 72 extending radially inward and able to be received in the hollow housing 66, 68.

Figure 3E:
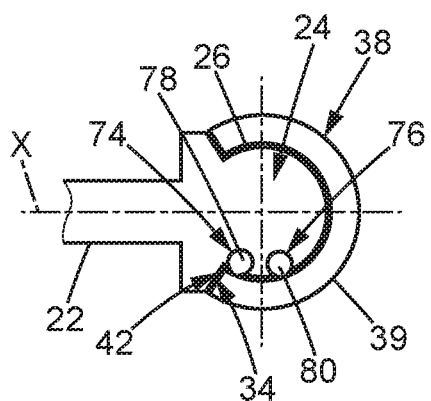

The male relief 24 from FIG. 3E is substantially identical to the male relief 24 from FIG. 3A. However, the constant-radius angular sector 26 is provided with two grooves 74, 76 each receiving an electric conductor 78, 80. The female relief 38 is then suited to conduct current from the electric conductors 78, 80 to the useful part 36 of the accessory 12 for supplying it with electricity.

Figure 3F:
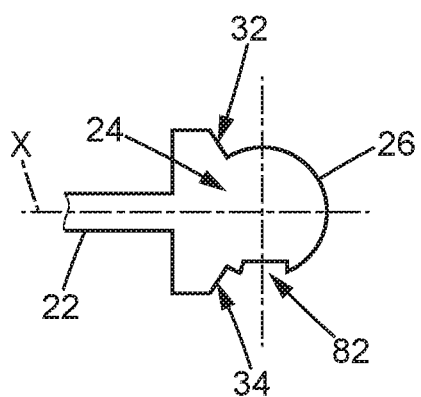

The male relief 24 from FIG. 3F is substantially identical to the male relief 24 from FIG. 3A. However, the constant-radius angular sector 26 is provided with a groove 82, preferably intended to be oriented towards the bottom once the attachment device 10 is attached to the wall. This groove 82 is intended to receive a tab from the female relief for avoiding rotation of the female element relative to the male element 24. As a variant, or in addition, this groove 82 receives electric conductors in order to provide electric power to the one or more accessories attached onto the attachment device.

Figure 3G:
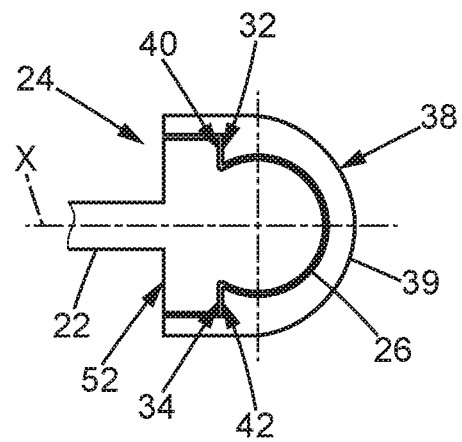

In FIG. 3G, the constant-radius angular sector 26, ends in two stop surfaces 32, 34 which extend substantially perpendicularly to the median X axis of the male relief 24 and the blade 22. Thus, the male relief 24 comprises a round angular sector 26 and a base 52 for this angular sector 26 having a substantially rectangular shape. Advantageously, in this case, the female relief 38 covers this rectangular base 40, for example by forming a housing suited to receive it, and extends substantially to the finishing layer applied to the wall 16.

Figure 3H:
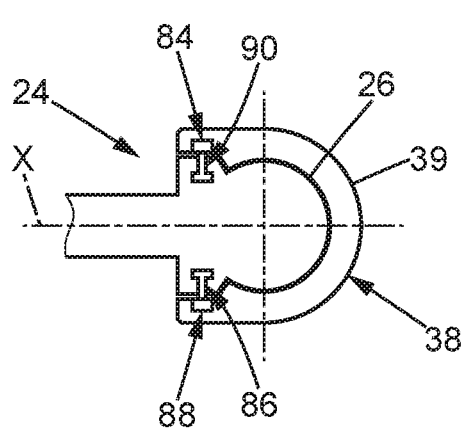

FIG. 3H shows a variant of FIG. 3A, where the segments parallel to the median axis X of the male relief 24, on one side and the female relief 38 on the other are hollowed with grooves 84, 86, 88, 90 that receive electrical conductors for providing electric power to the accessory once attached onto the attachment device.

On FIG. 4, the male relief 24 comprises first a constant-radius and your sector 26, extending to the end of a blade 22. However, the female relief 38 comprises a complementary housing made in the form of a cylindrical angular portion 39, with circular section. The female relief 38 also comprises two longitudinal walls 98, 100 extending parallel to the X axis of the blade 22. These two longitudinal walls 98, 100 are shaped to come to a stop on the finishing layer 46 when the accessory 36 is attached onto the attachment device 10.

Figure 6:
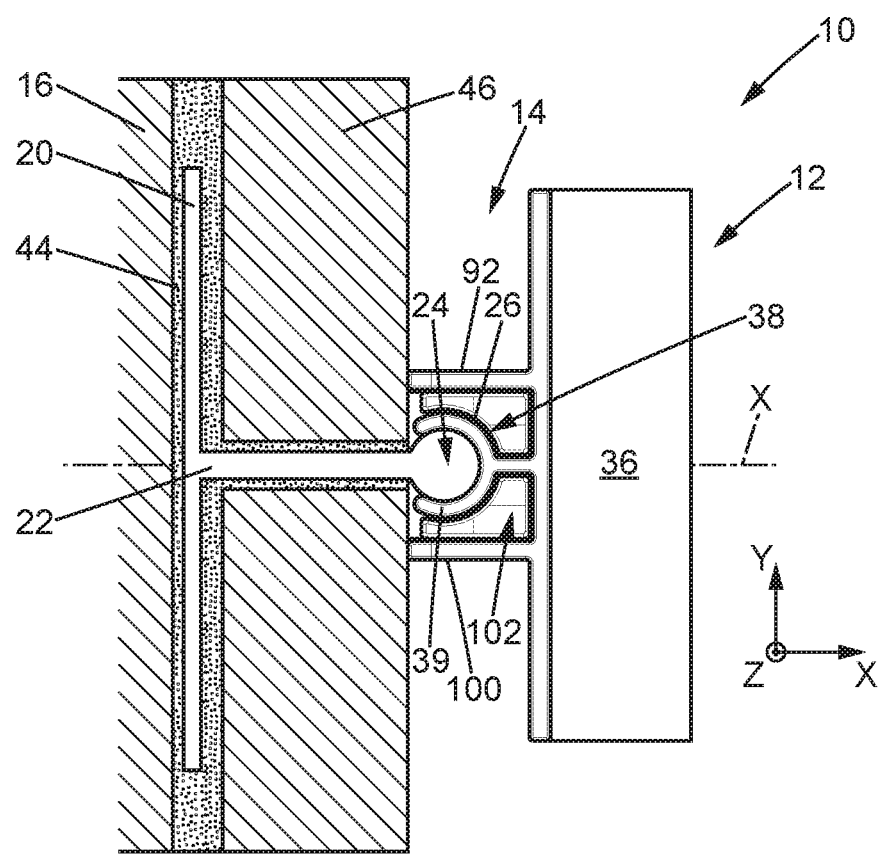

As shown in FIGS. 5 and 6, a block 102 can be provided in this case, which is mounted between the two longitudinal walls 98, 100 when the accessory 36 is attached onto the male relief 24. This block 102 has a section substantially complementary to the female relief 38 between the two longitudinal walls 98, 100 so it can be inserted therein, at a longitudinal end, in order to maintain the distance between the two longitudinal walls 98, 100. An accessory 36 with a larger weight can thus be attached onto the attachment device 14, because the block 102 reduces the risks of deformation of the male 24 and female 38 reliefs, which would be a problem for this attachment. The block 102 can have, as can be seen in FIG. 5, an end portion 104 whose dimensions are such that once the block 102 is attached onto the female relief 38 the end portion 104 hides the female relief 38 from one side.

Figure 7:
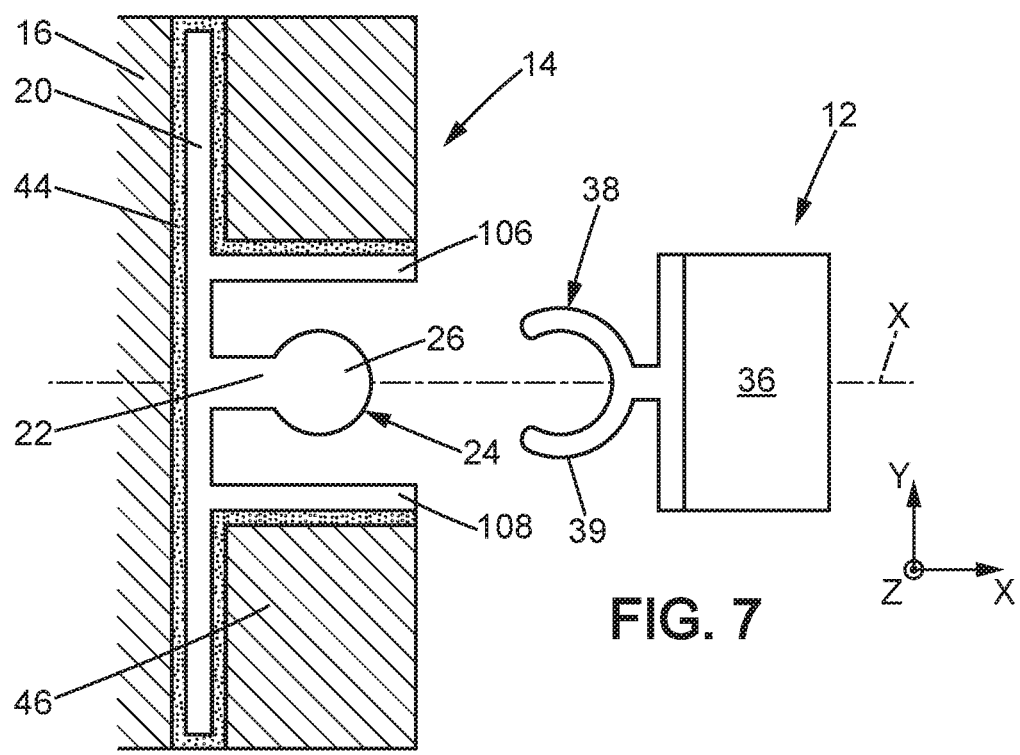
FIG. 7 illustrates in section a third example of assembly of an accessory and a device for attachment of the accessory onto a wall.

In the example from FIG. 7, the female relief 38 is similar to that in the example from FIG. 2. However, the blade 22 of the male relief 24 is shorter than in the example from FIG. 2. In this case, two longitudinal walls 106, 108 can be provided on either side of the blade 22, where the height, measured along the X direction of the blade 22 is substantially equal to the thickness of the finishing layer 46. Thus, the top of the longitudinal walls 106, 108 are flush with the surface of the finishing layer 46. This embodiment has the advantage that if there is no accessory attached on the male relief 24, it does not project beyond the finishing layer 46.

Figure 8:
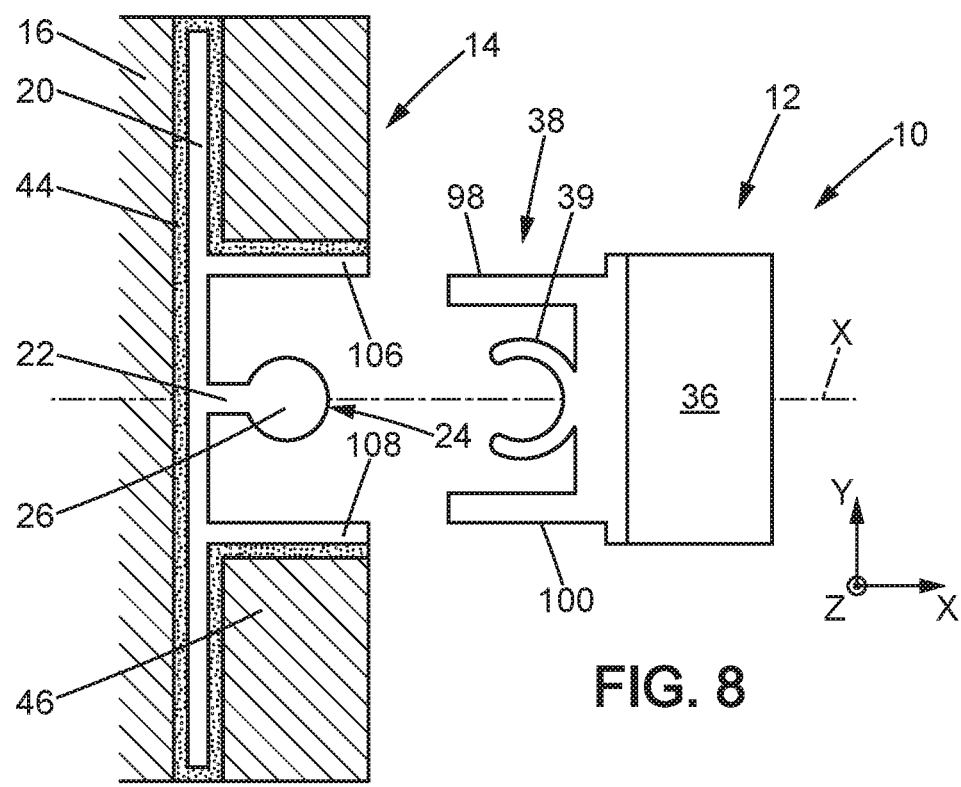
FIG. 8 illustrates in section a fourth example of assembly of an accessory and a device for attachment of the accessory onto a wall.

The embodiment from FIG. 8 combines the male relief from FIG. 7 with the female relief from FIG. 4. Here, the longitudinal walls 98, 100 around the cylindrical portion 39 of the female relief 38 are received, preferably clamped, between the longitudinal walls 106, 108 extending on either side of the angular sector 26 of the male relief 24. Thus, the engagement of the longitudinal walls 98, 100, 106, 108 makes the attachment of the accessory 12 onto the attachment device 14 more secure.

Figure 9:
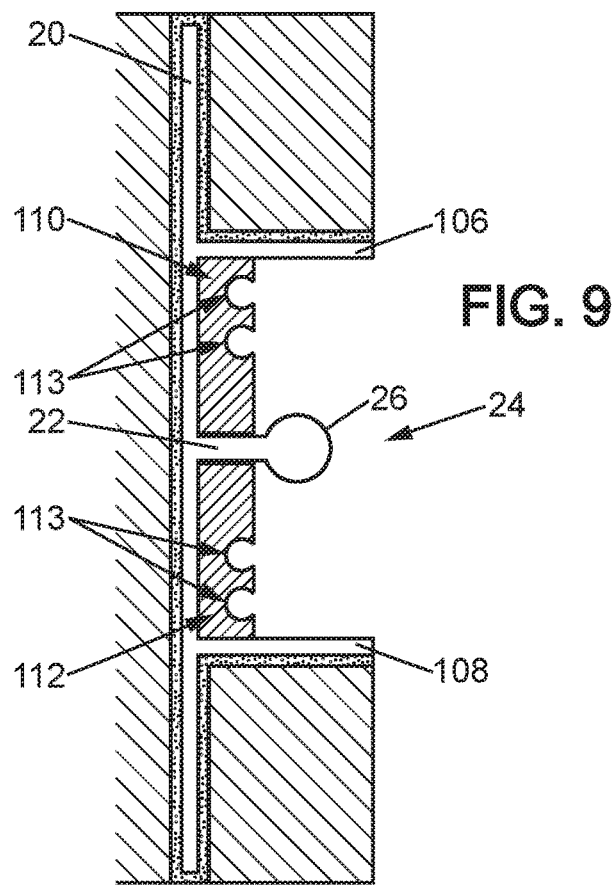
FIG. 9 schematically illustrates in section a variant of the fourth example of assembly of an accessory and a device for attachment of the accessory onto a wall.

FIG. 9 shows a variant of the male relief from FIGS. 7 and 8 where parts 110, 112 receiving conducting wires are arranged at the foot of the male relief 24. Here, these parts 110, 112 are each blocked between one of the longitudinal walls 106, 108 and the blade 22 to which the angular sector 26 is rigidly connected. The parts 110, 112 thus form rectangular parallelepipeds on one surface of which channels 113 are formed. Female reliefs 38 similar to those in the examples from FIGS. 7 and 8 can be implemented with this male relief 24.

Figure 10:
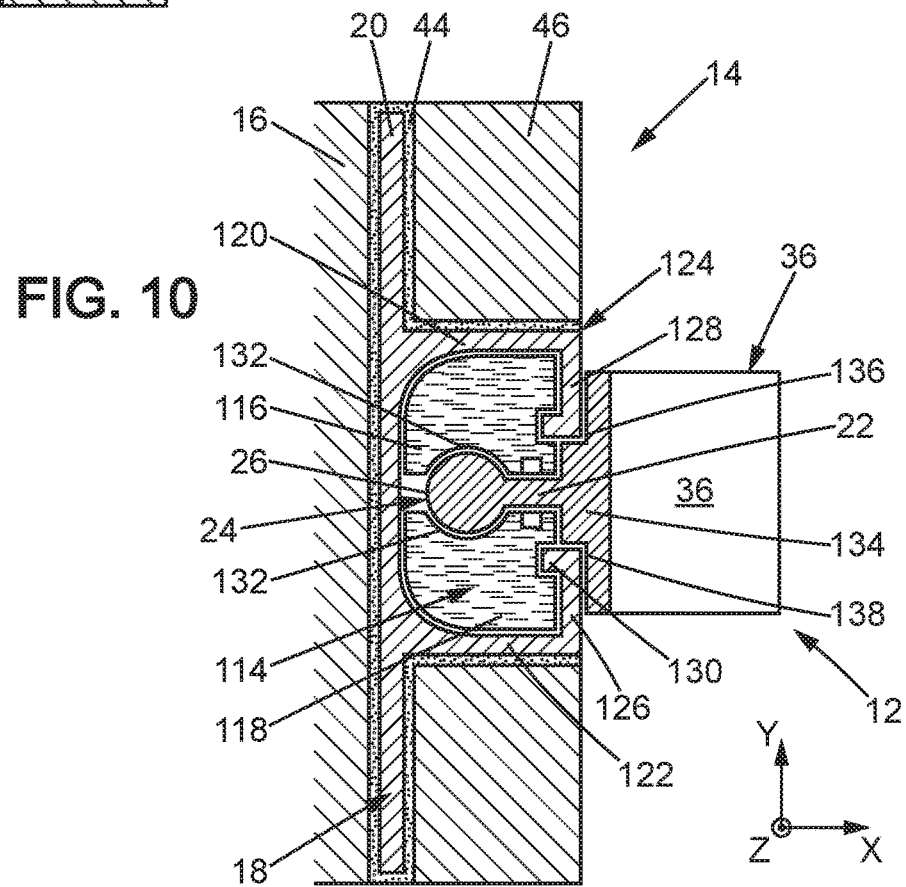
FIG. 10 represents schematically in section a fifth example of assembly of an accessory and a device for attachment of the accessory onto a wall.

FIG. 10 shows an attachment device example 14 forming a female attachment relief 38, where the male relief 24 is made on the accessory 36.

More specifically, the profile 18 forms a housing 114 for receiving two elastically deformable parts 116, 118, which are symmetric about a median plane and form a snap-fit female relief. The receiving housing 114 is here made by means of two longitudinal walls 120, 122 with edges 124, 126 turned-down towards each other, where the end 128, 130 is turned-down towards the base 20. The two parts 116, 118 are separated and have a longitudinal groove 132 on their facing surface, thus defining a housing for receiving a snap-fit male relief 24 with complementary section.

In the case of the example from FIG. 5, the accessory 12 is rigidly connected with a snap-fit male relief 24, in that case in the shape of an angular portion 26 of a cylinder, fixed at the free end of the blade 22 coming in turn from a support structure 134. The support structure 134 has a portion with a section complementary to the space between the turned-down ends 128, 130 of the two longitudinal walls 120, 122 so it can thus be received between these turned-down ends 128, 130 when the accessory 12 is attached onto the attachment device 14. Here, the support structure 134 has shoulders 136, 138 engaging with the turned-down edges 124, 126 of the longitudinal walls 120, 122 in order to prevent an insertion of the male relief 24 beyond the attachment position thereof in the female relief 38.

Figure 11:
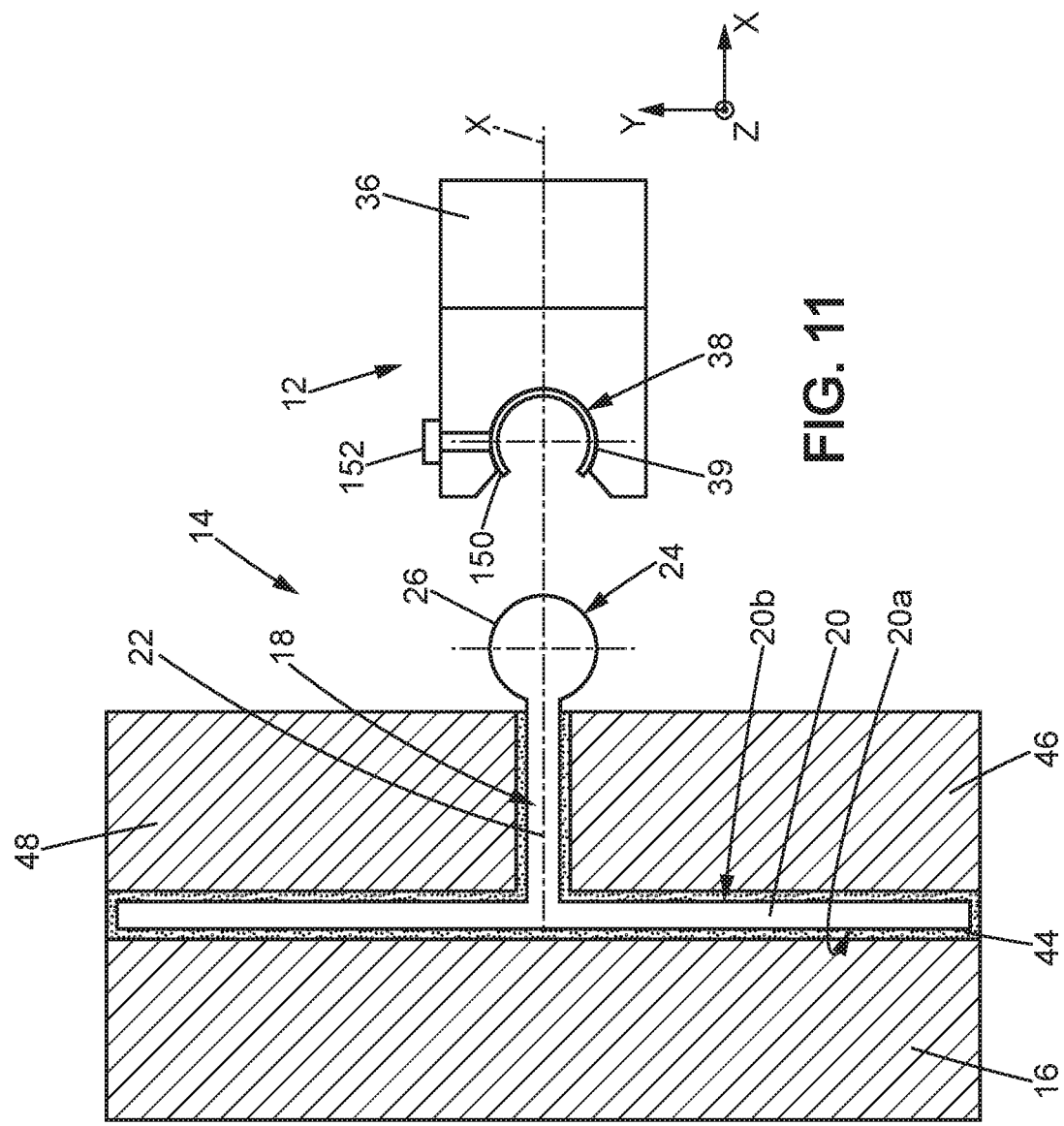
FIG. 11 represents schematically in section a sixth example of assembly of an accessory and a device for attachment of the accessory onto a wall.

FIG. 11 illustrates schematically in section a sixth example of assembly of an accessory and a device for attachment of the accessory onto the wall. Here, as for the example from FIG. 1, the snap-fit relief 24 comprises a first constant-radius circular angular sector 26 at the end of the blade 22.

The female relief 38 rigidly connected to the accessory 12 has for its part a housing 39 into which a flexible or deformable sheet 150 is inserted. The sheet 150 is curved, so as to follow, at least partially, at least one wall of the housing 39. In this case, the sheet 150 follows the entire wall of the housing 39.

The male relief 24 inserted in the housing 39 is snap-fitted therein, with the sheet pinched between the male relief 24 and the wall of the housing 39. This way a satisfactory attachment of the accessory 12 can be assured. The sheet 150 is for example plastic, which can be deformed by the insertion of the snap-fit relief 24 into the complementary housing 39.

Just the same, for further improving this attachment, the accessory 12 is provided with a screw 152 which immobilizes the snap-fit relief 24 of the device for attachment of an accessory into the complementary housing 39. The screw 152 in fact serves to force the snap-fit relief 24 against a wall of the complementary housing 39. In this case, the screw 152 forces the snap-fit relief 24 along a direction substantially normal to the direction of insertion of the snap-fit relief 24 into the complementary housing 39.

The screw 152 advantageously acts on the snap-fit relief 24 via the sheet 150, in order this way to avoid marking the snap-fit relief 24, which could affect a later unmounting and remounting. Other means for immobilizing the snap-fit relief 24 in the complementary housing 38 are accessible to the person skilled in the art. By implementing such a means, with identical plastic nesting reliefs, heavier accessories can be attached and/or attached more securely over time.

FIG. 12 shows an accessory 12 which can be attached to a wall by means of an attachment device 14 such as, for example, the one from FIG. 11. This accessory has a useful portion 36 fulfilling the function of the accessory 12. As an illustrative and nonlimiting example, FIG. 12 shows a towel-holder hook as an accessory.

Thus, in the case of the example from FIG. 12, the useful part 36 of the accessory 12 consists essentially of a solid cylindrical tube 361 having a head 362 whose dimensions are larger than the section of the cylindrical tube 361 in order to provide a retaining relief at the free end of the cylindrical tube 361.

The accessory 12 also comprises, at the base of the cylindrical tube 361, a base 200 forming a hollow housing 202. The surrounding 204 of the housing 202 has two opposite notches 206, which allow the snap-fit relief of the attachment device 14 to pass.

An insert 210 is then inserted in the housing 202. Here, the insert 210 is adhered into the housing 202 by means of the liquid resin 208. Alternatively, the insert 210 can be assembled in the housing 202 by force and thus be immobilized therein.

The insert is for example a plastic material.

The insert 210 essentially has a groove 212 with circular cross-section intended to receive the snap-fit relief of the attachment device 14 by snap-fit. This groove 212 extends over the full length of the insert 210, opening out at the longitudinal ends of the insert 210. The ends of the groove 212 are arranged across from notches 206 in the surrounding 204 of the housing 202.

Further, here, the insert 210 has a longitudinal slit 214 near the groove 212. This longitudinal slit 214 allows easier elastic deformation of the material surrounding the groove 212 during insertion of the snap-fit relief of the attachment device 14 into the groove 212. This slit 214 is for example located 2 mm from the rim of the groove 212. The slit 214 has a width of 0.7 mm, for example. However, the position and width of the slit 214 can be different, depending in particular on the material the insert 210 is made of and/or depending on the dimensions of the groove 212. These parameters can be adapted by the person skilled in the art depending on the intended use.

As shown in FIG. 12, the insert 210 has a notch 216 with rectangular section which allows a more precise positioning of the insert 210 in the housing 202 to be provided here by engaging with a relief 220 with complementary section projecting into the housing 202. A rectangular or square section is preferred to provide the most precise placement possible.

The notch 216 in the insert 210 is extended vertically, in FIG. 12, by a throat 225 opening into the groove 212. A mobile insert 222 is received in this throat 225, free in translation along one direction, vertical in FIG. 12, perpendicular to the groove 212 Finally, a screw 224, can be screwed into a passage 226 opening through the top of the projecting relief 220, opposite the throat 225 when the accessory is mounted, as in FIG. 13. A longer screw pitch is possible with the projecting relief 220.

Thus, as shown by FIG. 13, once the snap-fit relief of the attachment device 14 snap-fits in the groove 212, this snap-fit relief is clamped using the mobile insert 222 moved by screwing the screw 224. As is in particular visible in FIG. 13, the top of the mobile insert 222 intended to engage with the snap-fit relief of the attachment device 14 advantageously has a surface that is inclined and oriented downward, in FIG. 13, towards the bottom of the housing 202. Thus, the top of the mobile insert 222 forms a relief preventing withdrawal of the snap-fit relief of the attachment device 14 from the groove 212. The mobile insert provides a more secure attachment of the accessory 12 on a wall. Such a mobile insert 222 is particularly interesting to implement in the case of an accessory 12 that is relatively heavy and/or a particularly flexible material for the parts forming the snap-fit reliefs.

It should be noted that, according to an embodiment, the accessory can be moved along the snap-fit relief of the attachment device 14 before tightening the mobile insert 222 on the snap-fit relief of the attachment device 14.

It should also be noted that advantageously the accessory can be removed from the attachment device by loosening the mobile insert 222, which can be done without tools.

The dimensions of the mobile insert 222 can be adapted to the accessory and/or the preferred security of the attachment.

Figure 14:
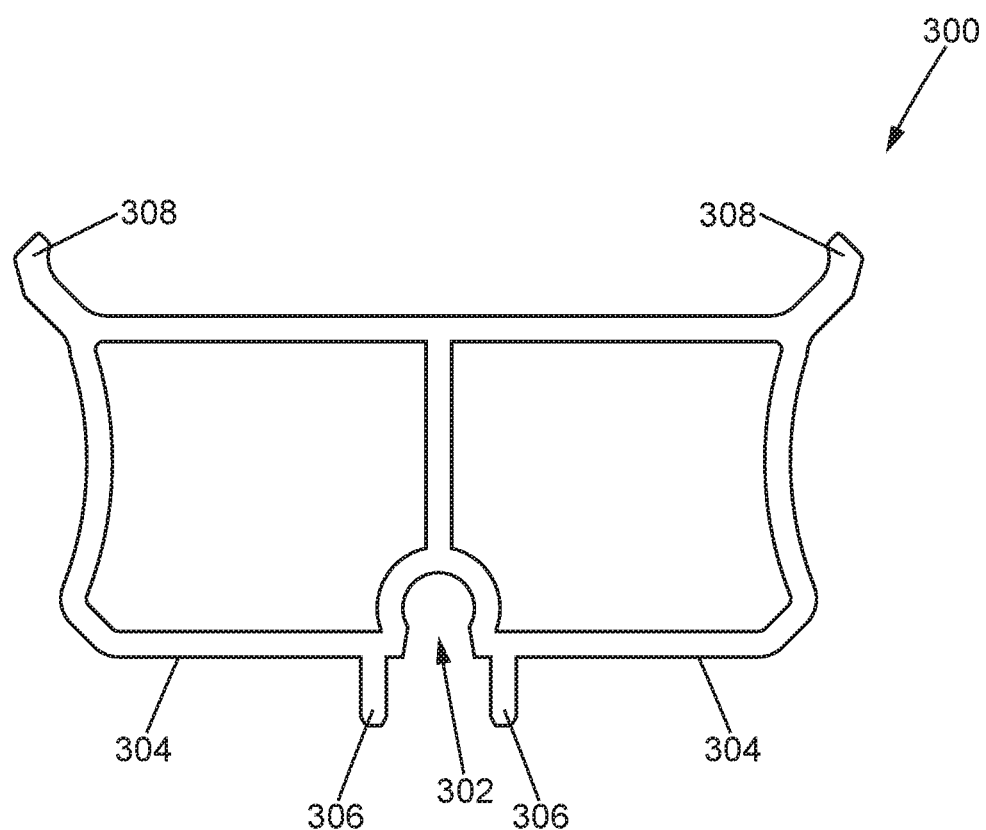
FIG. 14 schematically represents a transverse section view of a block which can be implemented in a method for mounting an attachment device on a wall.

Finally, FIG. 14 shows an example of a jig 300 (or block) which can be implemented in connection with a method for attachment on a wall of an attachment device 14, for example the one from FIG. 11.

As explained above, in such a method, it may be useful to place such a jig 300 on the snap-fit relief of the attachment device 14 during the step of application of a finishing layer covering the wall and the base 20 of the attachment device 14 to assure that the snap-fit relief is accessible to the complementary snap-fit relief of an accessory. In particular, the snap-fit relief is thus kept projecting from the finishing layer, after application thereof.

To do that here, the jig 300 has a groove 302 complementary to the shape of the snap-fit relief of the attachment device 14 in order to receive this relief by snap-fit, by snap-fit. Further, on either side of this groove 302, the jig 300 has a flat surface 304 intended to be placed in contact with the free surface of the finishing layer, once it has been applied.

Here, advantageously, in the immediate area of the groove 302, the jig 300 has two projecting walls 306. Here, these walls 306 are oriented substantially perpendicularly to the flat surfaces 304 intended to be in contact with the free surface of the finishing layer. These walls 306 thus form limits for the finishing layer. For example, tiles can be placed butted against the surfaces 304 and against the walls 306. Thus, advantageously, a space left hollow after the placement of the finishing layer can be delimited by these walls 306. This space left hollow can advantageously be used for placing a sealant or finishing after withdrawal of the jig 300.

The space between the two projecting walls 306 can in particular serve to receive two tabs extending perpendicularly to the blade connecting the snap-fit relief to the base, where each tab extends respectively from one surface of the blade.

Here, further, advantageously, the jig 300 has two projecting reliefs 308 (or fins) on the surface thereof opposite the walls 306, at these corners. These reliefs 308 substantially have a horn shape, in section. Advantageously with these two projecting reliefs 308, the space between the snap-fit relief of the attachment device 14 and the surface of the finishing layer can be cleaned, once it is applied. Also, in the case where the snap-fit relief is connected to the base by a blade perpendicular to the base, with one or preferably two tabs extending perpendicular to the blade, with each tab extending from an opposite side of the blade, the reliefs 308 can be adapted to clean the space between the snap-fit relief and these two tabs, once the finishing layer is applied.

The jig 300 can advantageously be made from plastic, in particular from PVC. Some parts of the jig 300 can advantageously be stiffer than others. In particular, the reliefs 308 are more flexible than the surface 304 intended to be flattened against the finishing layer.

The present disclosure is not limited to only the embodiments which were described but is instead subject to many variants accessible to the person skilled in the art.

In particular, the various embodiments described can be combined into embodiments not shown.

Further, the attachment of the accessory onto the attachment device can be reversible. In other words, the accessory can be successively attached to the attachment device and then removed.

In some embodiments, once the accessory is attached onto the attachment device, it is fixed and immobile. However, according to a variant, the accessory, attached to the attachment device, can be moved along the snap-fit relief.

Further, the blade of the male relief can be provided with tabs extending on either side of the blade. In section view of the attachment device, these tabs can have a length greater than or equal to 1 mm, preferably greater than or equal to 6 mm and/or less than or equal to 15 mm, preferably less than or equal to 10 mm. A precise and aesthetic positioning of the attachment device on the wall, in particular opposite the finishing layer, can be assured with these tabs. In particular, the base can then with the blade and the tabs form two housings for receiving tiles, strips or plates of material used as finishing layer.

Alternatively, the tabs can form a support for a jig such as described in connection with FIG. 14, for assuring the position relative to the base of the attachment device of the surfaces intended to be resting against the finishing layer. In this case, the walls 306 of the jig 300, extending on either side of the groove 302 intended to receive the snap-fit relief of the attachment device, can be inserted between the finishing layers and the ends of these tabs. This way, a hollow furrow can be formed between the attachment device and the finishing layer. Then in a later finishing step and after withdrawal of the jig, this furrow can be filled with a sealant.

The invention claimed is:

1. An assembly comprising an accessory and an attachment device for attachment of the accessory on a wall, the attachment device comprising a profile extending along a longitudinal direction and forming a snap-fit relief and a base in a transverse direction, where the base has first and second opposite flat surfaces, where the first surface of the base is intended to be attached flat on the wall and the snap-fit relief of the attachment device projects from the second surface of the base, wherein the accessory is provided with a snap-fit relief intended to engage with the snap-fit relief of the attachment device,
wherein the snap-fit relief of the attachment device comprises, in transverse section, a substantially round shape, over an angular sector extending over at least 180°,
wherein the snap-fit relief of the attachment device comprises at least one longitudinal wall extending from the second surface of the base along a direction normal to the second surface.

2. The assembly according to claim 1, wherein the profile forms a housing for receiving one or two parts, where the one or two parts form the snap-fit relief of the attachment device.

3. The assembly according to claim 1, wherein the snap-fit relief of the attachment device is a male relief.

4. The assembly according to claim 3, wherein the snap-fit relief of the attachment device is connected to the second surface of the base by a blade.

5. The assembly according to claim 4, where a tab extends from each side of the blade, parallel to the second surface of the base.

6. The assembly according to claim 1, wherein the snap-fit relief of the attachment device comprises, in transverse section, at least at one end of said angular sector, one among a radial projection and an indentation.

7. The assembly according to claim 1, wherein the profile is provided with at least one among electrical conductors and light sources.

8. The assembly according to claim 1, wherein the base extends, in transverse section, from only one side of the snap-fit relief of the attachment device or from both sides of the snap-fit relief of the attachment device.

9. The assembly according to claim 1, wherein the accessory comprises a housing complementary to the snap-fit relief of the attachment device, wherein the profile forms the snap-fit relief of the attachment device, wherein the accessory has a housing receiving an insert forming a complementary snap-fit relief able to receive the snap-fit relief of the attachment device, by snap-fit, where the accessory comprises a mobile insert mounted in the insert for clamping the snap-fit relief of the attachment device in the complementary snap-fit relief.

10. The assembly according to claim 1, comprising a housing complementary to the snap-fit relief of the attachment device, wherein the profile forms the snap-fit relief of the attachment device, in which a flexible or deformable sheet is inserted in the complementary housing, where the sheet extends at least in part along one wall of the complementary housing, where the complementary housing is able to receive the snap-fit relief of the attachment device, by snap-fit, such that the sheet is at least in part interposed between the snap-fit relief of the attachment device and said one wall of the complementary housing.

11. The assembly according to claim 10, wherein the accessory comprises a means for immobilizing the snap-fit relief of the attachment device in said complementary housing.

12. The assembly according to claim 1, wherein the profile forms the snap-fit relief of the attachment device.

13. The assembly according to claim 1, wherein the snap-fit relief of the attachment device is provided with at least one electrical conductor, wherein the at least one electrical conductor is received in grooves made in the surface of the snap-fit relief.

14. A method for mounting an accessory of an assembly according to claim 1 on the wall comprising the steps of:
a) attaching the attachment device of the assembly on the wall;
b) applying a finishing layer covering the wall and the base of the device, such that the snap-fit relief is accessible;
c) attaching the accessory onto the attachment device, by snap-fit of the respective snap-fit reliefs thereof.

* * * * *